United States Patent [19]

Zaunberger

[11] Patent Number: 4,497,218

[45] Date of Patent: Feb. 5, 1985

[54] COMPACT DRIVE ASSEMBLY

[75] Inventor: Franz X. Zaunberger, Augsburg, Fed. Rep. of Germany

[73] Assignee: Zahnraderfabrik Renk A.G., Augsburg, Fed. Rep. of Germany

[21] Appl. No.: 382,715

[22] Filed: May 27, 1982

[30] Foreign Application Priority Data

Jan. 29, 1982 [DE] Fed. Rep. of Germany ....... 3202880

[51] Int. Cl.³ .................... F16H 37/06; F16H 1/42; B62D 11/00
[52] U.S. Cl. .......................... 74/682; 74/705; 74/714; 74/720.5; 74/665 T; 180/6.2; 180/6.7
[58] Field of Search .............. 74/720.5, 674, 695, 74/705, 710, 710.5, 714, 764, 665 F, 665 G, 74/665 GA, 665 GB, 665 GC, 665 T, 682; 180/6.44, 180/6.7, 6.2

[56] References Cited

U.S. PATENT DOCUMENTS

| | | | |
|---|---|---|---|
| 3,543,871 | 12/1970 | Klaue | 180/6.7 |
| 3,785,450 | 1/1974 | Suzuki | 74/665 T X |
| 3,938,604 | 2/1976 | Kugler et al. | 74/720.5 X |
| 3,966,005 | 6/1976 | Binger | 74/720.5 X |
| 4,184,387 | 1/1980 | Kiritani et al. | 74/720.5 |
| 4,280,579 | 7/1981 | Zaunberger et al. | 180/6.44 |
| 4,327,603 | 5/1982 | Zaunberger et al. | 74/665 T |
| 4,420,991 | 12/1983 | Meyerle | 74/665 T X |

FOREIGN PATENT DOCUMENTS

| | | | |
|---|---|---|---|
| 714061 | 10/1941 | Fed. Rep. of Germany | 180/6.7 |
| 1129068 | 5/1962 | Fed. Rep. of Germany | 74/720.5 |
| 1780106 | 12/1971 | Fed. Rep. of Germany | 180/6.44 |
| 2055380 | 3/1972 | Fed. Rep. of Germany . | |
| 2310097 | 9/1974 | Fed. Rep. of Germany . | |
| 2424332 | 12/1974 | Fed. Rep. of Germany . | |
| 2521331 | 11/1978 | Fed. Rep. of Germany . | |
| 2042441 | 9/1980 | United Kingdom | 180/6.44 |

OTHER PUBLICATIONS

International Wehrrevue, Sep. 1981, p. 1394.
Automobiltechnische Zeitschrift 82, (1980), 7/8, pp. 393–394.

Primary Examiner—Lawrence J. Staab
Assistant Examiner—Stephen Andrews
Attorney, Agent, or Firm—Natter & Natter

[57] ABSTRACT

A drive system for a tracked vehicle includes a composite transmission having a primary transmission unit and a secondary transmission unit which is driven by components of the primary transmission unit. The primary transmission unit includes a propulsion gear and a steering gear both of which are driven from an engine drive shaft. The secondary transmission unit includes a pair of planetary gear sets which drive a pair of output wheels, tracks or chains of the vehicle. In order to conserve space, the transmission is configured such that the propulsion gear and the steering gear are positioned alongside the engine adjacent the drive shaft end of the engine and the secondary transmission components extend in front of the drive shaft end of the engine with a portion of each planetary gear set projecting alongside the engine. In an alternate embodiment, the propulsion gear and steering gear are positioned alongside the engine adjacent the drive shaft end while the secondary transmission components are positioned adjacent the opposite end of the engine.

15 Claims, 9 Drawing Figures

COMPACT DRIVE ASSEMBLY

TECHNICAL FIELD

The present invention relates generally to transmissions for tracked vehicles such as military tanks. More specifically, the invention deals with transmissions which employ planetary gear sets for engaging tracks, a propulsion gear unit and a steering unit for driving the planetary gear sets and wherein the transmission components are arranged in a novel space and weight saving configuration.

BACKGROUND ART

Drive assemblies for vehicles wherein both propulsion and steering of the vehicle has been achieved by the control of the rotation of drive wheels or gears have been employed in conjunction with tracked vehicles such as tanks. Such drive assemblies may also be employed in conjunction with wheeled earth moving or farm vehicles as disclosed in U.S. Pat. No. 4,184,387.

In transmission systems for these vehicles an engine drive shaft engaged a propulsion or speed change gear unit as well as a steering unit. The propulsion unit drove secondary transmission components including a main shaft which was oriented transversely to the engine drive shaft; the main shaft engaged a pair of planetary differential gears. The steering unit superimposed steering control on the planetary differential gears through a zero shaft. The zero shaft also lay perpendicular to the engine output shaft. Each planetary differential gear drove a vehicle track, chain or drive wheel.

Typical examples of prior tracked vehicle transmission systems were illustrated in U.S. Pat. Nos. 3,966,005, 3,601,211, 3,534,635, 3,425,296 and 3,373,636. Additional examples of similar transmissions for tracked vehicles are shown in United Kingdom Pat. Nos. 1,296,666, 1,155,867, 1,126,782 and 978,037.

In prior drive assemblies with gear output shafts lying on axes transverse to the engine drive shaft, the transmission casing was interconnected to the engine casing by mating flanges at the shaft end of the engine. Since there normally was also an engine flywheel assembly between the engine and transmission, the entire drive assembly was of substantial length, occupied significant vehicle space and thus detracted from the total useful interior space of the vehicle and mandated large, heavy and inherently costly vehicles.

DISCLOSURE OF THE INVENTION

In compendium, the invention comprises a drive assembly for a tracked vehicle, the assembly including an engine, primary transmission components and secondary transmission components driven by the primary components. The primary transmission components include a propulsion gear unit and a steering unit, both of which are driven through the engine drive shaft. The secondary transmission components include a pair of planetary gear sets which drive the tracks, chains or output wheels of the vehicle.

To provide a compact drive assembly, the primary transmission components are positioned astride the engine rather than in front of or behind the engine and portions of secondary components also extend alongside the engine.

In a first embodiment, the primary transmission components are positioned alongside the engine adjacent its drive shaft end and the secondary transmission components extend forwardly of the drive shaft end with a portion of the planetary gear sets projecting alongside the engine adjacent the primary transmission components. In an alternate embodiment, the primary components are positioned alongside the engine adjacent the drive shaft end and the secondary components are positioned adjacent the opposite end of the engine.

Various mounting arrangements permit assembly and removal of the transmission without removal of the engine or alternately removal of the engine and primary transmission components as a single unit.

From the foregoing summary, it will be seen that it is a feature of the present invention to provide a compact drive assembly of the general character described for propulsion and steering of tracked type vehicles which assembly is not subject to the disadvantages of the background art aforementioned.

A further aspect of the present invention is to provide a compact drive assembly of the general character described for propulsion and steering of tracked type vehicles which assembly is of short overall length yet includes state of the art drive components.

Another aspect of the present invention is to provide a compact drive assembly of the general character described for propulsion and steering of tracked type vehicles which assembly includes a superimposed continuously adjustable steering system, fluid operated assemblies such as torque converters and flow brakes while occupying but a modicum of space.

A further aspect of the present invention is to provide a compact drive assembly of the general character described for propulsion and steering of tracked type vehicles which is adaptable to economical, low cost mass production manufacturing techniques.

Yet another feature of the present invention is to provide a compact drive assembly of the general character described for propulsion and steering of tracked type vehicles which facilitates economical servicing outside of the vehicle.

Other features and aspects of the present invention in part will be obvious and in part will be pointed out hereinafter.

With these ends in view, the invention finds embodiment in certain combinations of elements and arrangements of parts by which the said features and aspects and certain other features and aspects are hereinafter attained, all as more fully described with reference to the accompanying drawings and the scope of which is more particularly pointed out and indicated in the appended claims.

BRIEF DESCRIPTION OF THE DRAWINGS

In the accompanying drawings in which are shown some of the various possible exemplary embodiments of the invention.

DESCRIPTION OF THE PREFERRED EMBODIMENTS

In the following detailed description, it is to be understood that the following terms which will be employed therein should be construed to include the definitions set forth below:

Engine: Any prime mover including an internal combustion engine, a gas turbine engine and a motor.

Total Transmission Gearing: All torque, force or motion transmission of propulsion force from an engine to drive wheels, tracks or chains of a vehicle and for the transmission of forces required for steering the vehicle from the same engine to the same drive wheels, tracks or chains.

Propulsion Gear: A gearing which determines vehicle speed and possibly the direction of travel including mechanical speed change gearing and a hydromechanical power transmission, i.e. a transmission shiftable under load with hydro-mechanical gearing. The propulsion gear provides speed and torque conversion between an engine and output shafts of a total transmission gearing.

Steering Gear: A gearing between an engine and a zero or neutral transmission shaft of a total transmission gearing. The steering gear may be of conventional design such as a continuous hydrostatic drive, a hydrostatic-hydrodynamic drive, a hydrostatic-mechanical drive, or a mechanical multistep turning drive. The steering gear serves to steer the vehicle by superimposing steering control on planetary differential gear sets.

Primary Transmission Component: Components of the total transmission gearing which are driven by the engine including the propulsion gear and the steering gear.

Secondary Transmission Component: That portion of the total transmission gearing which is driven by the primary transmission components including a main shaft and planetary differential gear sets, as well as a zero shaft which also drives the planetary differential gears.

Fluid Brake: A transmission brake which operates in a fluid medium such as a flow brake, turbobrake, or retarder.

Figure 1:
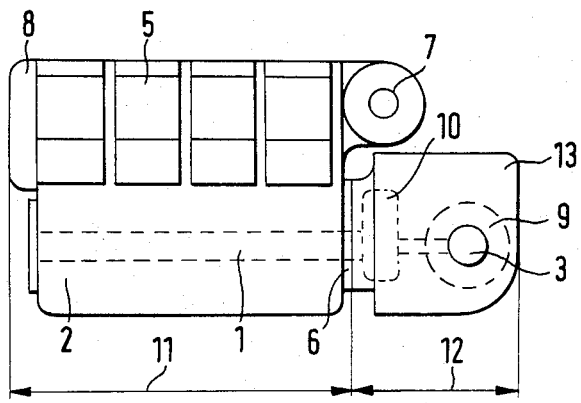
FIG. 1 is a schematized side elevation view of a prior art tracked vehicle drive assembly indicating the general position of the various elements thereof and depicting the length of such assembly.

Referring now in detail to the drawings, FIG. 1 illustrates a prior art drive assembly for a tracked vehicle. The drive assembly includes an engine 2 which may comprise a diesel engine having a pair of cylinder rows 5 in V configuration. An engine output or drive shaft 1 extends along a longitudinal axis beneath the cylinder rows and projects from a forward end of the engine. Conventional devices included with the engine 2 are an exhaust gas turbosupercharger 7 and auxiliary groups 8 of known design, both of which form no aspect of the present invention.

A total transmission gearing 13 is constructed as a unit and connected to the engine 2 at an assembly flange 6. The total transmission gearing 13 is shown to include, in an exemplary manner, a propulsion gear 9 which is driven from the drive shaft 1 through a torque converter 10. The propulsion gear 9, in turn, drives a pair of opposed output shafts 3 through planetary differential gear sets (not shown in FIG. 1). The output shafts 3 drive the vehicle drive wheels or gears for the chains or tracks of the vehicle.

As illustrated in FIG. 1, the length of the drive assembly of the prior art includes both the length of the engine (denoted by the reference numeral 11) and the length of the total transmission gearing 13 (denoted by the reference numeral 12).

Figure 2:
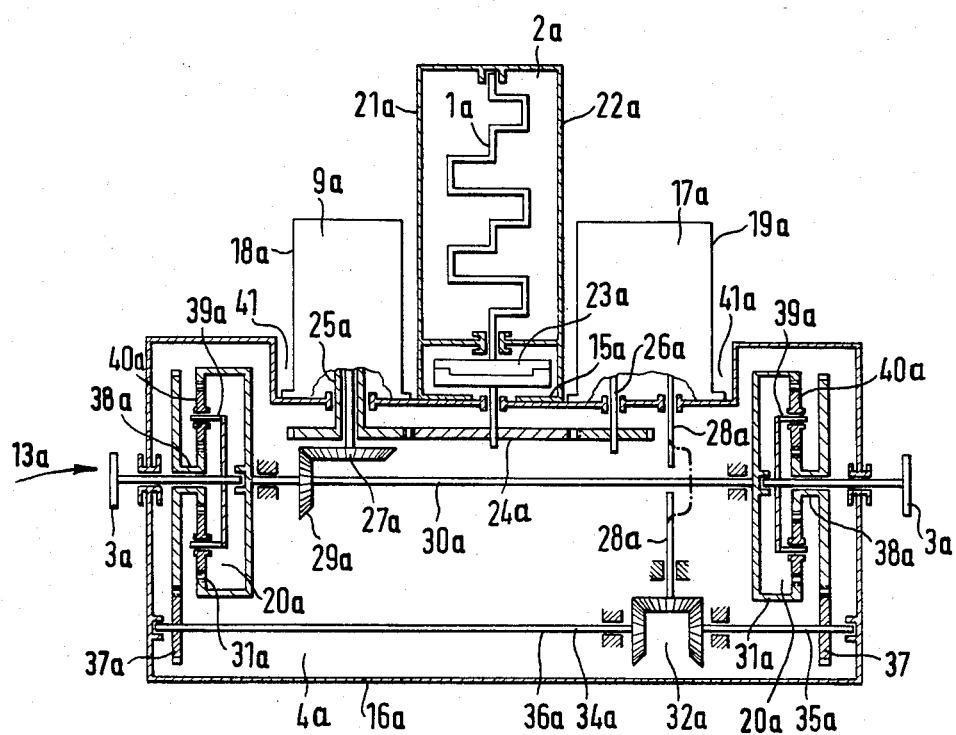
FIG. 2 is a schematized plan view of a compact drive assembly embodying the present invention and showing the spatial component integration of a vehicle engine and a transmission system in accordance with the invention.

Referring in detail to the remaining figures where various embodiments of the drive assembly of the present invention are illustrated, FIG. 2 comprises a schematized plan view of the spatial component integration of an engine and total transmission gearing in accordance with the invention. Like numerals used in the designation of components of the prior art (FIG. 1) will be employed hereinafter, however bearing various suffix letters particular to each embodiment.

In FIG. 2, an engine 2a includes a drive shaft 1a illustrated as a crank shaft. Mounted on a forward (drive shaft) end 15a of the engine 2a is a casing 16a of a total transmission gearing 13a. On opposite sides of the casing 16a, a pair of output shafts 3a project perpendicular to the engine drive shaft 1a.

In accordance with the invention, a housing 18a carrying a propulsion gear 9a of known design, e.g. a continuous hydrostatic drive, a hydrostatic-hydrodynamic drive, a hydrostatic-mechanical drive or a mechanical multistep turning drive, are arranged on opposite sides of the engine 2a. The axes of the propulsion gear 9a and the steering gear 17a extend parallel to that of the drive shaft 1a. The housings 18a, 19a of the propulsion gear 9a and the steering gear 17a, respectively, are mounted to the casing 16a at assembly flanges on a casing surface adjacent the engine 2a.

An alternate mounting arrangement for the propulsion gear 9a and the steering gear 17a may comprise incorporating the housing 18a of the propulsion gear 9a and the housing 19a of the steering gear 17a in one piece with the transmission casing 16a. In lieu of attaching the casing 16a to the engine 2a at an assembly flange, the casing 16a may be secured directly to the vehicle, e.g. to the tank. With such mounting arrangement, the engine 2a or the total transmission gearing 13a may be exchanged or serviced independently of the other by removal from the vehicle.

The total transmission gearing 13a includes secondary transmission components denoted generally by the reference numeral 4a. The secondary transmission components include a pair of planetary differential gear sets 20a which function as steering integrating differential gears. As can be observed from FIG. 2, portions of each of the planetary gear sets 20a extend or project beyond the plane of the drive shaft end 15a of the engine 2a toward the rear end of the engine 2a in a direction substantially parallel to a pair of opposed side walls 21a, 22a of the engine. The function of each planetary differential gear set 20a is to superimpose on the rotation of its output shaft 3a a relative rotary motion required for steering control of the vehicle.

Interconnecting the engine drive shaft 1a and the primary transmission components which comprise the propulsion gear 9a and the steering gear 17a is an oscillation damping clutch 23a. A spur gear 24a driven by the clutch 23a, in turn, drives an input shaft 25a of the propulsion gear and an input shaft 26a of the steering gear with both input shafts 25a, 26a being oriented parallel to the drive shaft 1a.

The propulsion gear 9a includes an output shaft 27a which drives a main shaft 30a through a bevel gear set 29a. The main shaft 30a extends along an axis perpendicular to that of the drive shaft 1a and, in turn, drives a ring gear 31a of each planetary gear set 20a.

An output shaft 28a of the steering gear 17a extends above or beneath the main shaft 30a and drives a zero shaft denoted generally by the reference numeral 36a through a bevel gear arrangement 32a. In a known manner, the zero shaft 36a comprises a pair of segments 34a, 35a coaxially arranged. As can be observed from FIG. 2, the zero shaft 36a extends parallel to the main shaft 30a and hence is perpendicular to the output shaft 1a of the engine 2a.

The zero shaft 36a includes a pinion 37a adjacent each of its ends with the pinion 37a engaging a sun gear 38a of each of the planetary gear sets 20a. The output shafts 3a are, in turn, driven by a cage or carrier 39a which carries a plurality of planet gears 40a. The planet gears 40a are engaged between the ring gear 31a and the sun gear 38a.

It should be noted that the spatial component arrangement of the vehicle drive assembly in accordance with the present invention provides substantial space conservation with the forward end 15a of the engine projecting considerably into a space denoted generally by the reference numeral 41a between parallel projecting portions of the planetary gear sets 20a.

Figure 3:
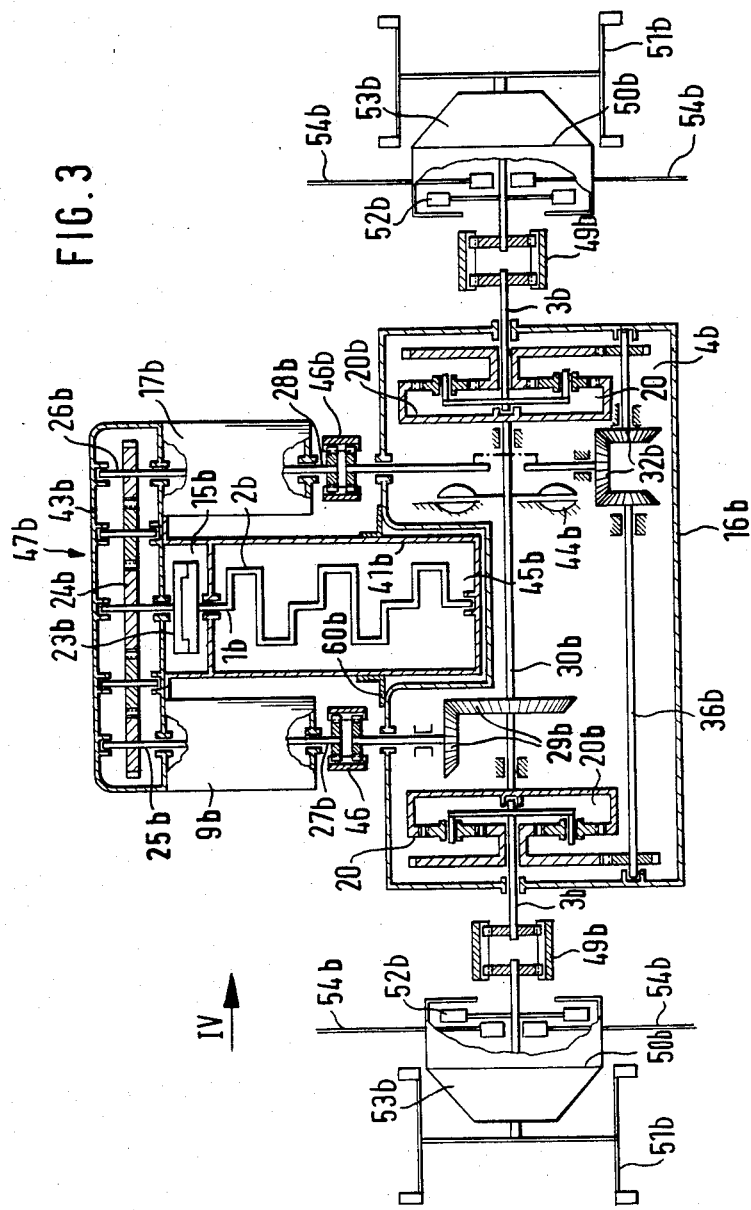
FIG. 3 is a further schematized plan view of a compact drive assembly constructed in accordance with and embodying the invention yet showing an alternate embodiment thereof wherein primary transmission components comprising a propulsion gear unit and a steering unit are mounted adjacent a drive shaft end of the engine while secondary transmission components are mounted adjacent the opposite end.

A compact drive assembly constructed in accordance with an alternate embodiment of the invention is illustrated in FIG. 3 wherein like numerals denote components similar to those previously described, bearing however a suffix letter b. In this embodiment a total transmission gearing 13b is spatially configured in conjunction with an engine 2b so that the drive assembly will occupy reduced length as well as width. Primary transmission components 47b are carried in a housing 43b which is mounted to the engine 2b adjacent its drive shaft end 15b at an assembly flange. The housing 43b is of generally U-shaped plan configuration and carries a spur gear 24b driven by a clutch 23b and which drives an input shaft 25b of a propulsion gear 9b and an input shaft 26b of a steering gear 17b through intermediate pinions.

A transmission casing 16b carries secondary transmission components 4b and is secured to the housing of the engine 2b adjacent its rear end 45b through an assembly flange 60b. The casing 16b carries a fluid brake 44b of known design disposed on a main shaft 30b in addition to a pair of planetary differential gear sets 20b and a zero shaft 36b. The secondary gear components are so arranged that the main shaft 30b is preferably close to the end 45b as illustrated in FIG. 3. As such, the engine 2b extends substantially within a space 41b formed between the planetary differential gears 20b, such space extending a depth practically one half the diameter of the planetary gear sets 20b, the fluid brake 44b and one half the diameter of a bevel gear 29b which drives the main shaft 30b.

Figure 4:
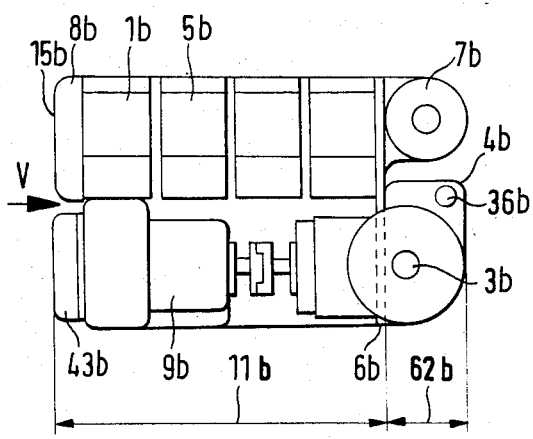
FIG. 4 is an auxiliary side elevation view of the compact drive assembly illustrated in FIG. 3, the same being taken substantially along the plane 4—4 of FIG. 3 and indicating the shorter overall length of such drive assembly as compared to the prior art.

As illustrated in FIG. 4 wherein a schematized side elevation view of the drive assembly is shown, the zero shaft 36b may be positioned at an elevation above that of the output shafts 3b, hence above the main shaft 30b which is coaxial with the output shafts.

In accordance with the invention, therefore, the casing 16a requires a length dimension denoted by the numeral 62b in a direction parallel to that of the engine drive shaft 1b which is significantly less than the corresponding dimension 12 of the prior art casing 16. It will be appreciated that the length 62b is essentially the same as the diameter of a turbosupercharger 7b. Thus, in accordance with the invention, the entire drive assembly including both the primary and secondary transmission components does not substantially exceed the space occupied by the engine 2b and its auxiliary devices such as the turbosupercharger 7b.

Not only is the compact drive assembly of reduced length as may be observed from a comparison of FIGS. 1 and 4 but, in addition, it occupies an area of width reduced from that of the prior art. Referring now to FIG. 3, it should be noted that the left planetary gear set 20b and the bevel gear set 29b are arranged along the main shaft 30b in close proximity to the left side wall 22b of the engine 2b and behind the propulsion gear 9b. Similarly, the right planetary gear set 20b and an optional flow brake 44b are arranged along the main shaft 30b close to the right side wall 21b of the engine 2b and behind the steering gear 17b.

A pair of clutches 46b are employed between the propulsion gear 9b and the steering gear 17b and the secondary transmission components 4b. One clutch 46b interconnects a propulsion gear output shaft 27b with the bevel gear 29b which, in turn, drives the main shaft 30b. A second clutch 46b interconnects a steering gear output shaft 28b with a bevel gear set 32b which drives the zero shaft 36b. The clutches 46b are positioned between the primary component housing 43b and the secondary component casing 16b so as to be accessible externally. The clutches 46b are readily releasable, e.g. pluggable.

The output shafts 3b are each connected to a drive wheel 51b for engaging vehicle drive chains through an easily releasable clutch 49b and an interconnect unit 50b. The units 50b are each secured to a side panel 54b of the vehicle and comprise a mechanical disc brake 52b and a countershaft speed reduction gear 53b.

Figure 5:
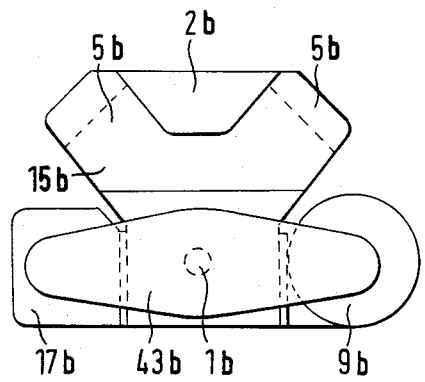
FIG. 5 is an end elevational view of the compact drive assembly, the same being taken substantially along the plane 5—5 of FIG. 4 at the drive shaft end of the engine.

As can be observed in FIG. 5, a total transmission gearing 13b in accordance with this embodiment provides conservation not only of drive assembly length but, in addition, conserves space in a width direction.

With the engine 2b having a V arrangement of cylinder rows 5b, the propulsion gear 9b and the steering gear 17b do not project significantly beyond the width occupied by the cylinder rows of the engine block.

The mechanical disc brakes 52b may also be employed with the drive assembly of the prior embodiment illustrated in FIG. 2 and it is immaterial whether the brakes 52b are arranged on the transmission output shafts 3b or on the drive shafts of the countershaft gears 53b as illustrated in FIG. 3. It should further be understood that both the propulsion gears and steering gears may include, for the purpose of torque conversion and rotational output, mechanical gear constructions and/or fluid pumps, fluid motors or electrical mechanisms.

Figure 6:
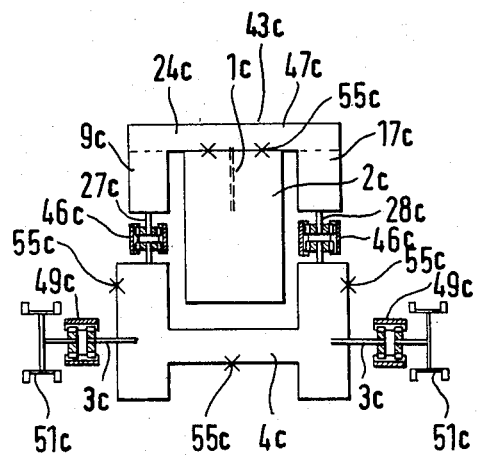
FIG. 6 is a schematized plan view of a further embodiment of the compact drive assembly of the present invention showing an alternate mounting arrangement for assembly and disassembly.

A further embodiment of the invention is schematically illustrated in FIG. 6. This embodiment is practically identical in construction to the embodiment of FIGS. 3, 4, and 5, however a housing 43c which carries primary transmission components 47c is mounted to the drive shaft end of an engine 2c at fixation points indicated generally by the reference numerals 55c. Secondary transmission components 4c and their casing 16c are secured directly to the vehicle, however, in lieu of being mounted to the engine 2c. The reference numerals 55c also indicate exemplary fixation points for the casing 16c. It will be appreciated that in this embodiment, if the secondary transmission components are in need of servicing, the casing 16c may be removed as a separate unit by disengaging the clutches 49c and 46c and disconnecting at the fixation points. A substitute casing 16c carrying working secondary transmission components may then be mounted in the vehicle.

Figure 7:
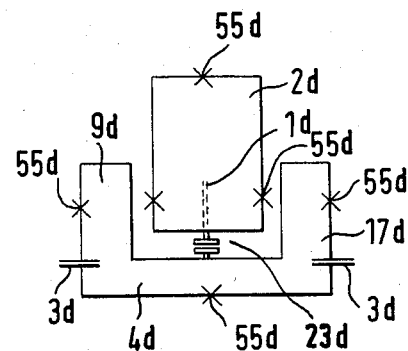
FIG. 7 is a schematized plan view of a further embodiment of the compact drive assembly similar to the embodiment of FIG. 2 yet illustrating a further variant mounting arrangement.

In a further embodiment illustrated in FIG. 7, a propulsion gear 9d, a steering gear 17d and the remainder of a total transmission gearing 13d are carried as part of a transmission block which is secured directly to the vehicle at a plurality of fixation points denoted by the reference numerals 55d. The transmission block is exchangeable as a complete unit independently of an engine 2d. To facilitate removal and exchange, an externally accessible clutch 23d interconnects a drive shaft 1d of the engine 2d with primary transmission components 47d.

Figure 8:
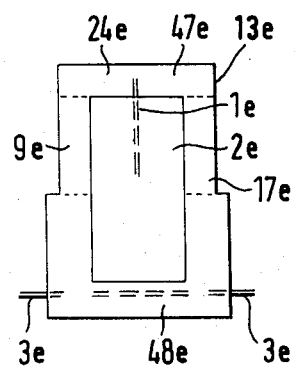
FIG. 8 is a schematized plan view of yet another embodiment of the compact drive assembly of the present invention and illustrating a further mounting arrangement.

In another embodiment illustrated in FIG. 8, a total transmission gearing 13e includes primary transmission components 47e and secondary transmission components 43 which, together with an engine 2e, form a common drive block having a common housing. The entire drive assembly is removed or replaced as a single unit.

Figure 9:
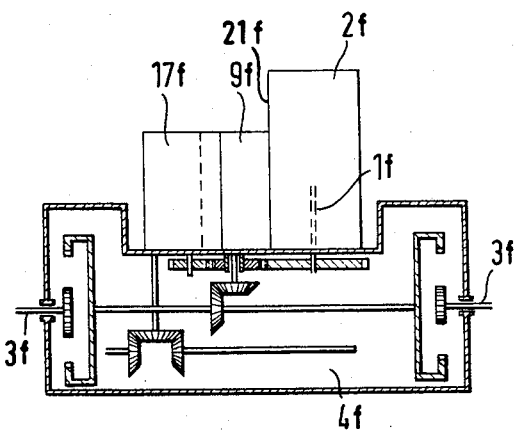
FIG. 9 is a schematized plan view of a further embodiment of the compact drive assembly wherein all of the primary transmission components are positioned adjacent one side of the engine.

A further embodiment of the invention is illustrated in FIG. 9. In this embodiment, a steering gear 17f and a propulsion gear 9f are disposed on the same side 21f of an engine 2f parallel to a drive shaft 1f of the engine.

Thus, it will be seen that there is provided a compact drive assembly which achieves the various features and aspects of the invention and which is well suited to meet the conditions of practical usage.

As various modifications might be made in the invention as above set forth, it is to be understood that all matter herein described or shown in the accompanying drawings is to be interpreted as illustrative and not in a limiting sense.

Having thus described the invention, there is claimed as new and desired to be secured by Letters Patent:

1. A drive system for a vehicle having an engine with a drive shaft, the engine extending a distance from end to end in a direction coincident with the drive shaft axis, the drive system including a transmission for both propulsion and steering of the vehicle by control of the rotational speed of vehicle drive wheels, the transmission comprising a propulsion gear and a steering gear, means for drivingly interconnecting the propulsion gear and the steering gear with the engine drive shaft, a pair of planetary differential gear sets, the planetary gear sets being spaced from one another, a main shaft, means for drivingly interconnecting the main shaft and one segment of each planetary gear set, means for drivingly interconnecting the propulsion gear with the main shaft, a zero shaft, means for drivingly interconnecting the steering gear with the zero shaft, means for drivingly interconnecting the zero shaft with another segment of each planetary gear set, a pair of output shafts for propulsion of the vehicle drive wheels, and means for drivingly interconnecting a further segment of each planetary gear set with one of the output shafts, the main shaft and the zero shaft having axes parallel to one another and perpendicular to the axis of the drive shaft, the propulsion gear being mounted alongside the engine and projecting in a horizontal direction a distance between the ends of the engine, the steering gear being mounted alongside the engine and extending in a horizontal direction a distance between the ends of the engine, the main shaft being positioned adjacent one end of the engine and being spaced from the one end in a direction away from the engine, the propulsion gear and the steering gear being spaced from the main shaft in a direction toward the engine, the propulsion gear including an input shaft and an output shaft and the steering gear including an input shaft and an output shaft, the output shafts of the propulsion gear and the steering gear being parallel to the drive shaft axis, portions of the planetary gear sets projecting perpendicular to the axis of the main shaft, the drive system further including means forming a space between the projecting planetary gear set portions adjacent one side of the main shaft, the one end of the engine being positioned within the space, whereby an efficient drive system of reduced length is provided.

2. A drive system constructed in accordance with claim 1 wherein the propulsion gear is positioned adjacent one side of the engine and the steering gear is positioned adjacent another side of the engine.

3. A drive system constructed in accordance with claim 1 wherein the input shafts of the propulsion gear and of the steering gear are parallel to the engine drive shaft axis.

4. A drive system constructed in accordance with claim 1 wherein the propulsion gear and the steering gear comprise a primary transmission unit, the main shaft, the zero shaft and the planetary gear sets comprising a secondary transmission unit.

5. A drive system constructed in accordance with claim 4 wherein the means for drivingly interconnecting the propulsion gear and the steering gear with the drive shaft includes gear means, the primary transmission unit further including the gear means and the secondary transmission unit further including the means for drivingly interconnecting the propulsion gear with the main shaft and the means drivingly interconnecting the steering gear with the zero shaft.

6. A drive unit constructed in accordance with claim 4 wherein one of the transmission units is independently detachable from engagement with the drive system, whereby removal for replacement or repair is facilitated.

7. A drive system constructed in accordance with claim 6 wherein both of the transmission units are independently detachable from engagement with the drive system whereby removal for replacement or repair is facilitated.

8. A drive system constructed in accordance with claim 5 wherein the primary transmission unit is positioned adjacent the drive shaft end of the engine and the secondary transmission unit is positioned adjacent the opposite end of the engine.

9. A drive system constructed in accordance with claim 4 wherein the means for drivingly interconnecting the propulsion gear with the main shaft and the means for drivingly interconnecting the steering gear with the zero shaft include releasable clutch means whereby the secondary transmission unit is releasably coupled to the primary transmission unit, the system further including releasable clutch means for interconnecting the output shafts with the vehicle drive wheels whereby the secondary transmission unit is independently detachable from engagement with the vehicle.

10. A drive system constructed in accordance with claim 5 wherein the primary transmission unit and the secondary transmission unit form a single transmission assembly, the drive system further including means for securing the transmission assembly to the vehicle independently of the engine.

11. A drive assembly constructed in accordance with claim 5 further including an engine, the engine, the primary transmission unit and the secondary transmission unit forming a drive block, the drive assembly further including a common housing, the drive block being carried in the common housing.

12. A drive system constructed in accordance with claim 1 wherein the zero shaft is positioned at an elevation different than that of the main shaft, the main shaft and the zero shaft being positioned adjacent the same end of the engine.

13. A drive system constructed in accordance with claim 1 further including a flow brake and a pair of mechanical brakes, means for interconnecting the flow brake with the main shaft for selectively braking the rotational speed of the one segment of each of the planetary gear sets and means interconnecting each of the mechanical brakes with the further segment of each of the planetary gear sets for selectively braking the rotational speed of the output shafts.

14. A drive system constructed in accordance with claim 1 wherein the engine includes an engine block having cylinder rows which project laterally, the propulsion gear and the steering gear being positioned beneath the cylinder rows.

15. A drive system constructed in accordance with claim 1 wherein the propulsion gear and the steering gear are both positioned along the same side of the engine.

* * * * *